(No Model.) 5 Sheets—Sheet 1.
W. MASON.
MACHINE FOR COUNTING GUN WADS.
No. 319,284. Patented June 2, 1885.
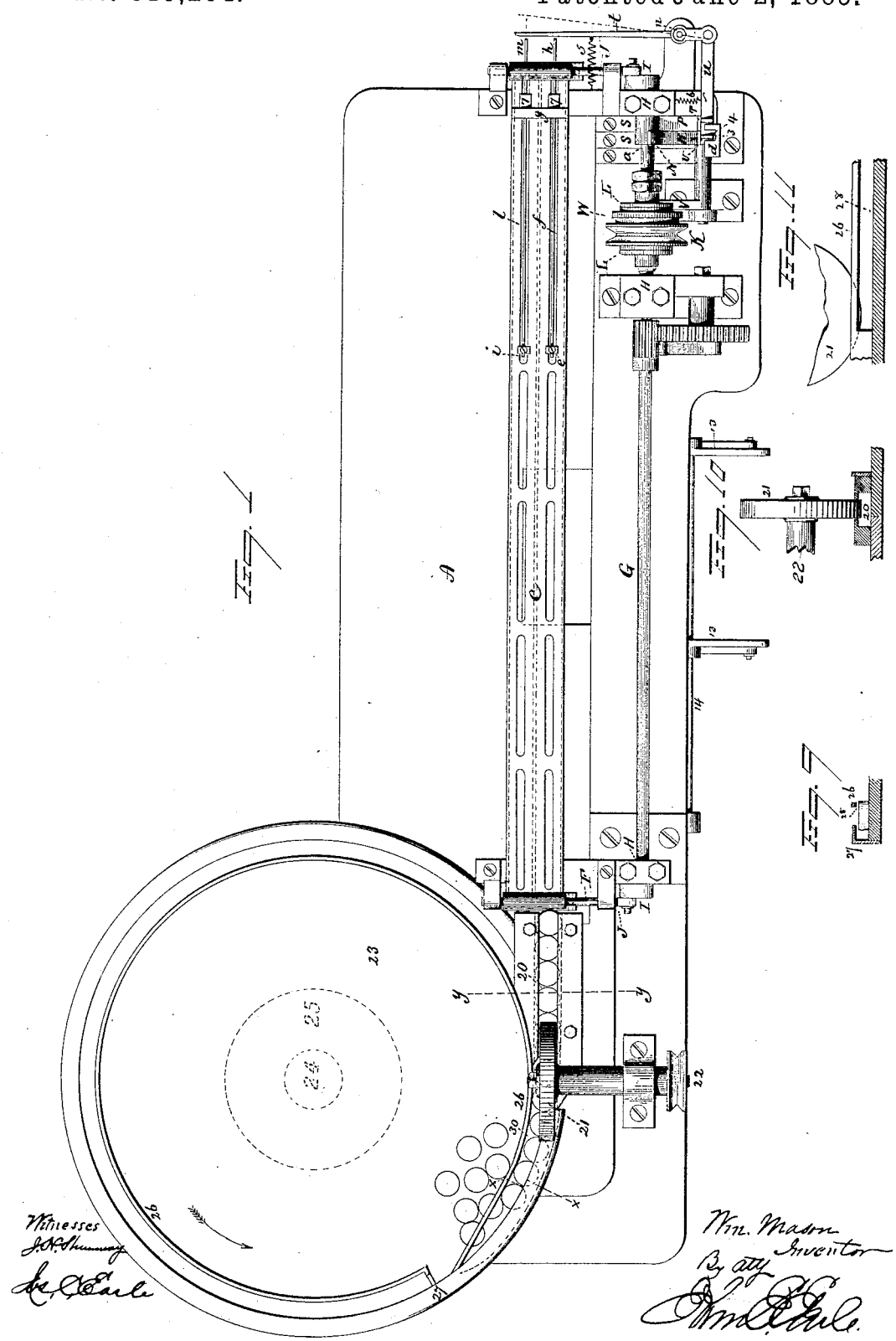
Witnesses
Wm. Mason
Inventor

W. MASON.
MACHINE FOR COUNTING GUN WADS.
(No Model.) 5 Sheets—Sheet 2.
No. 319,284. Patented June 2, 1885.
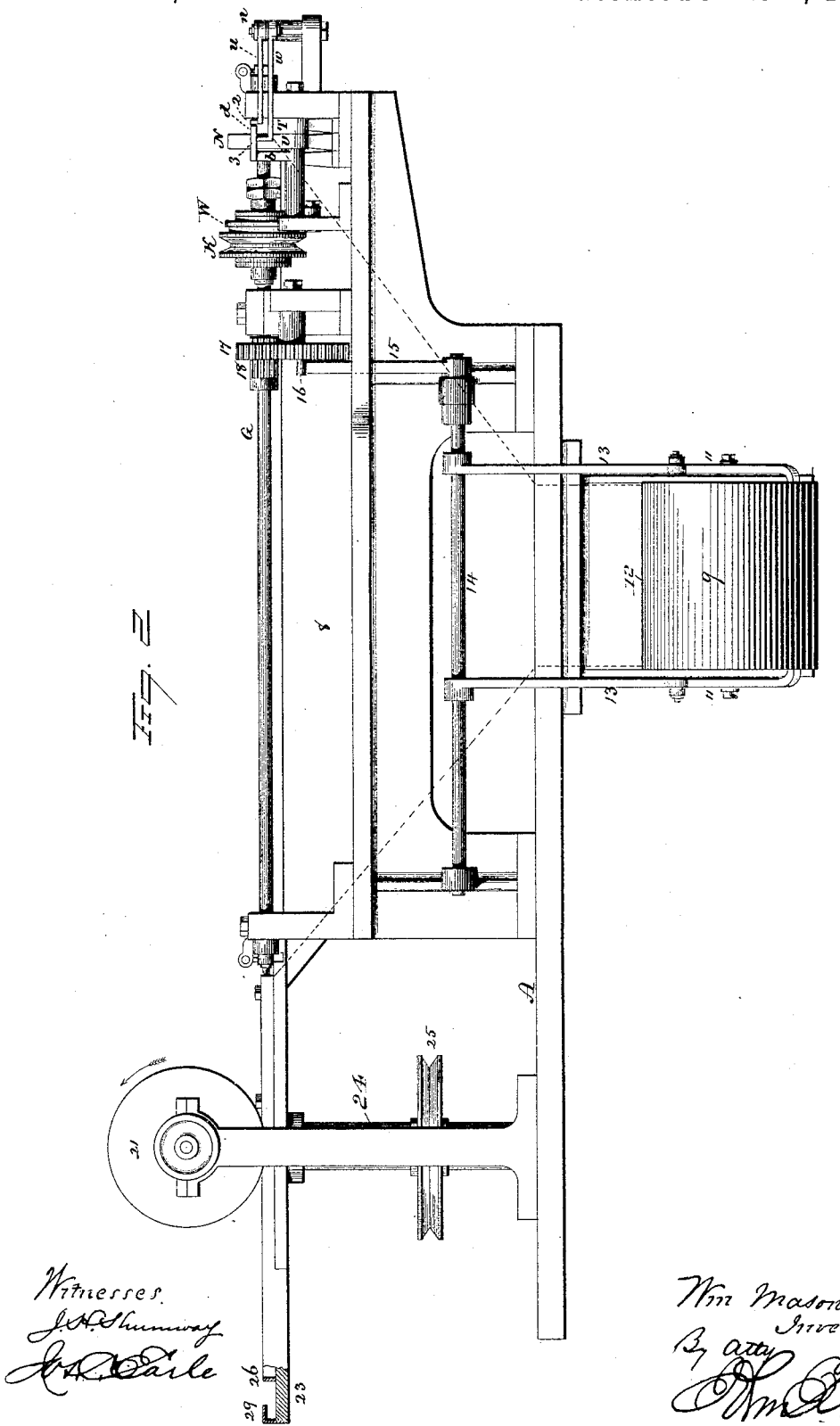
Witnesses
Wm Mason, Inventor

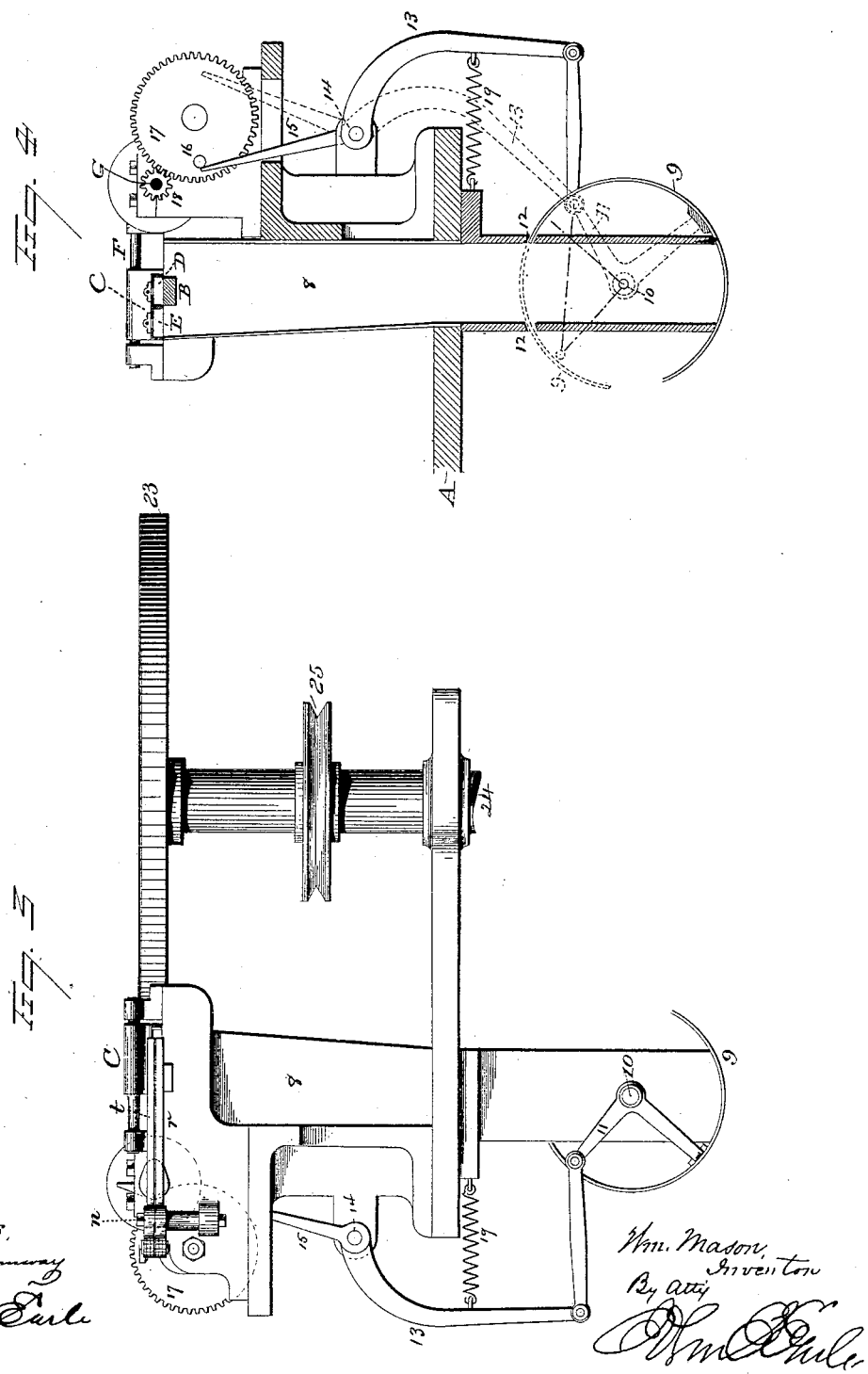

(No Model.) 5 Sheets—Sheet 4.
W. MASON.
MACHINE FOR COUNTING GUN WADS.
No. 319,284. Patented June 2, 1885.
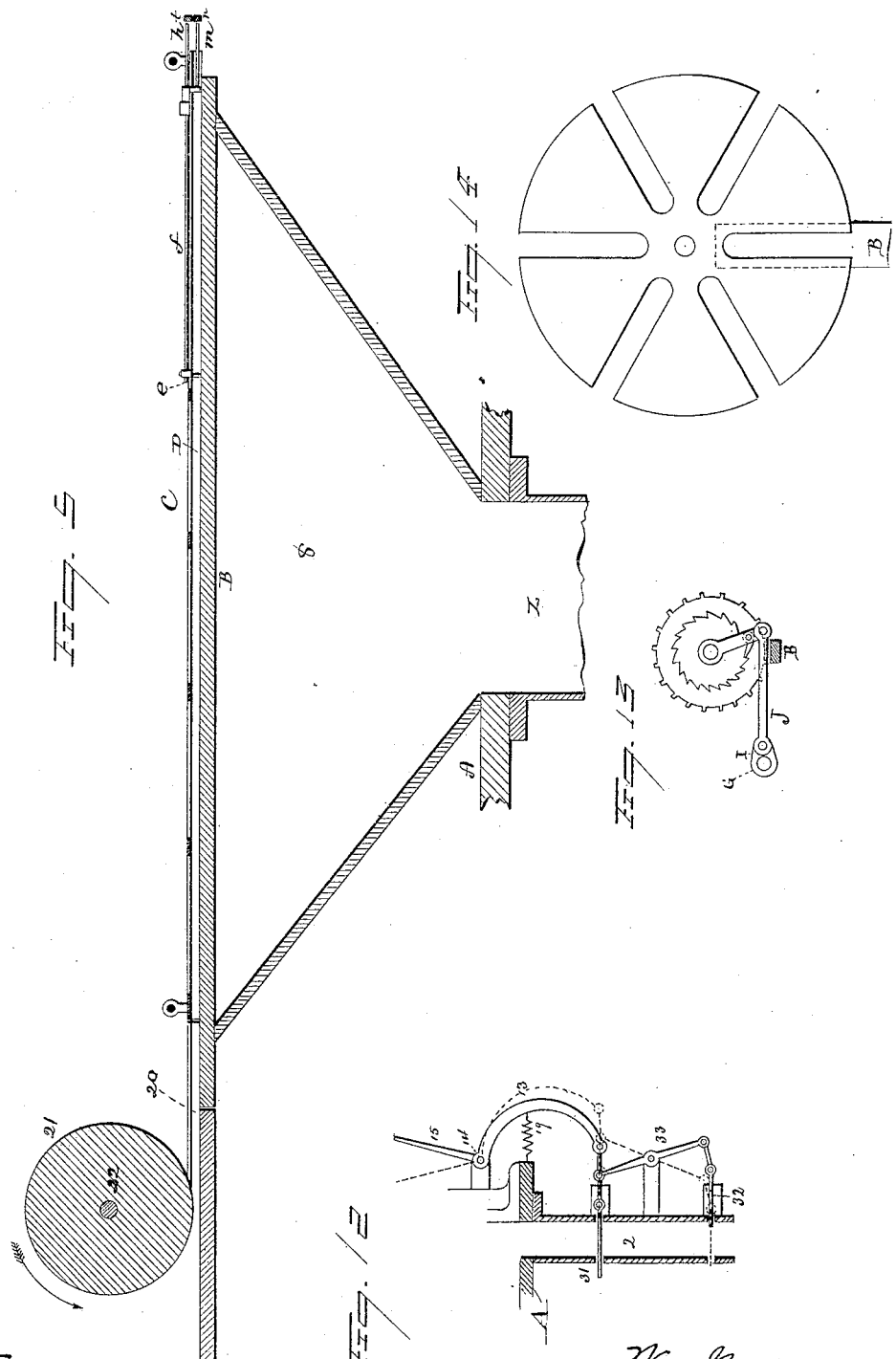
Witnesses
Wm. Mason, Inventor

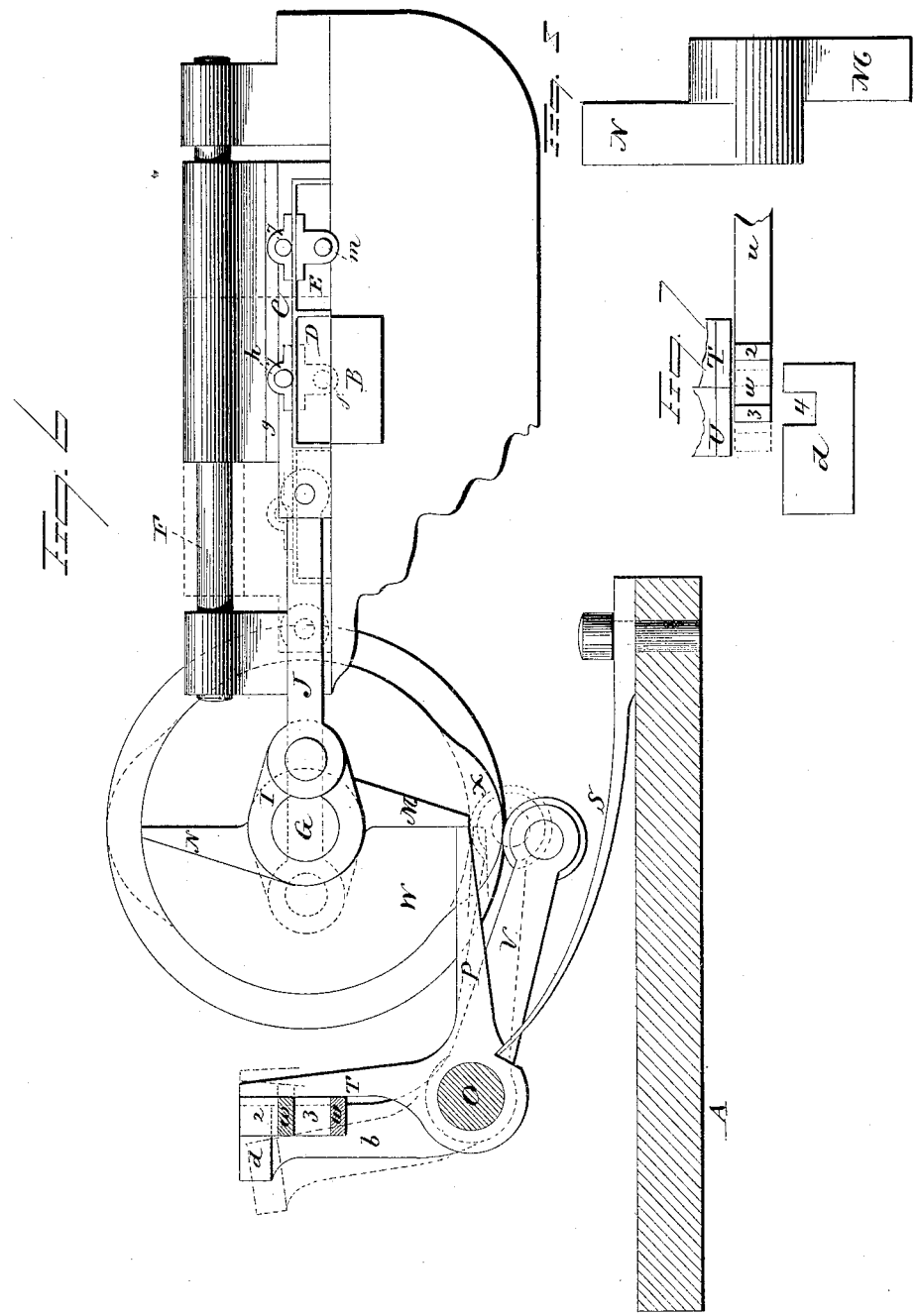

United States Patent Office.

WILLIAM MASON, OF NEW HAVEN, CONNECTICUT, ASSIGNOR TO THE WINCHESTER REPEATING ARMS COMPANY, OF SAME PLACE.

MACHINE FOR COUNTING GUN-WADS.

SPECIFICATION forming part of Letters Patent No. 319,284, dated June 2, 1885.

Application filed March 16, 1885. (No model.)

*To all whom it may concern:*

Be it known that I, WILLIAM MASON, of New Haven, in the county of New Haven and State of Connecticut, have invented new Improvements in Machines for Counting Gun-Wads; and I do hereby declare the following, when taken in connection with accompanying drawings and the letters of reference marked thereon, to be a full, clear, and exact description of the same, and which said drawings constitute part of this specification, and represent, in—

Figure 1, a top or plan view of the machine complete; Fig. 2, a front view of the same; Fig. 3, a right-hand end view enlarged; Fig. 4, a transverse section through the hopper, looking to the right; Fig. 5, a longitudinal section through the hopper; Fig. 6, an end view, looking from the right, parts removed to show the arms on the shaft, dogs, and levers employed in imparting the intermittent reciprocating movement to the receiver, enlarged; Fig. 7, a detached view, looking down upon the fingers and the projection of the lever $b$ to illustrate the operation of the fingers between the dogs and the extension $d$, also enlarged; Fig. 8, a side view of a portion of the shaft, showing the arms M N; Fig. 9, a transverse section on line $x\ x$ of Fig. 1, showing the space between the guards 26 and 27; Fig. 10, a transverse section on line $y\ y$ of Fig. 1, looking toward the feed-wheel; Fig. 11, an inside view of the guard 26, showing the opening through which the wads pass to the channel; Fig. 12, a modification of the gate; Figs. 13 and 14, modifications of the receiver.

This invention relates to a machine for counting gun-wads.

Gun-wads as prepared for market are placed in packages containing usually two hundred and fifty wads. As each of the wads is necessarily greased before being placed in the package, and the grease when applied is in a fluid condition, it follows that the wads absorb more or less of the grease, and the amount of absorption depends upon the texture of the wad, some absorbing much more than others, and the weight of the wads will vary according to the variation of the grease absorbed, as well as to the varying texture of the material; hence it is impractical to rely upon a certain weight to indicate a certain number of wads, and to insure such certain number of wads in each package they must be counted.

The object of my invention is to produce a machine which will automatically count the wads, and so counted deliver them to the package; and my invention consists, principally, in a receiver in width slightly greatly than the diameter of the wads to be counted, and into which the wads are successively delivered, edge to edge, combined with a stop, which, when a certain predetermined number of wads have been delivered to the receiver, will automatically engage with mechanism to discharge the wads from the said receiver and prepare to receive a second charge, as more fully hereinafter described.

A represents the bed on which the operative mechanism is arranged; B, a longitudinal stationary bar, which is in width substantially that of the diameter of the wads to be counted, may be little more or less. This bar is arranged in a horizontal plane. (See Figs. 4 and 5.)

Over the bar B the receiver C is arranged. This receiver is in the form of a flat bar, having in its under side two longitudinal recesses, D and E. (See Figs. 4 and 6.) The recesses correspond in width and depth substantially to the diameter and thickness of the wads to be counted, may be somewhat greater. At each end the receiver C is supported on a transverse bar, F, and so as to slide transversely thereon, as indicated in broken lines, Fig. 6, and so that in one position the recess D of the receiver will stand over the bar B, while the recess E will stand at one side of the bar. In the other position the recess E will stand over the bar, and the recess D at the opposite side of the bar, as seen in Fig. 6.

G is a longitudinal shaft, parallel with the receiver C, supported in bearings H, and at each end is fitted with a crank, I, each crank connected to the receiver at its respective end by a rod, J, and so that the revolution of the shaft will impart corresponding transverse reciprocating movement to the receiver, one extreme of the crank throwing the receiver to the position seen in Fig. 6 to take the recess E to one side of the bar and bring the recess D over the bar, and the other extreme, as indicated in broken lines, Fig. 6, to take the recess E over the bar and carry the recess D to the opposite side of the bar, and so that as the receiver stands in the position seen in Fig. 6, the recess D being filled with a predetermined number of wads, a half-revolution of the shaft G will take that recess from over the bar B to one side, as indicated in broken lines, Fig. 6, and so that the wads will fall therefrom. Then, standing in that position the recess E will in its turn be filled, and the return of the crank will carry the recess E to the opposite side of the bar B, and the wads which it has received fall therefrom, and so continue to do so long as the shaft is turned to thus move the receiver and wads are supplied thereto.

The movement of the shaft G must be intermittent in order to give time in which to fill the respective recesses. To accomplish this, a driving-pulley, K, is arranged on the shaft, but held there by frictional plates L L, said frictional plates being made fast to the shaft, and so that if the shaft be held the pulley will revolve between the plates without effect upon the shaft; but if the shaft be free then the friction between the pulley and the plates will be sufficient to cause the shaft to turn with the pulley, a device common in many classes of machinery where intermittent rotation is desired.

To hold the shaft in each of its extreme positions while the respective recesses on the receiver are over the bar, the shaft is provided with two arms, M N, diametrically opposite each other, (see Fig. 6,) but offset, as seen in Fig. 8, so that they revolve in different planes.

Upon a shaft, O, parallel with the shaft G, two dogs, P R, are hung respectively in the paths of the arms M N. Each is provided with its own independent spring S, the tendency of which is to raise the dog into the path of the respective arms M N, as seen in Fig. 6, that being the normal condition of the dogs.

From the dogs respectively an arm, T U, extends upward, as seen in Fig. 6. Hung upon the shaft O is a lever, one arm, V, of which extends beneath a cam, W, made fast to the pulley K, this cam W having a projection, X, at one point in its circumference, which will depress the arm V, as indicated in Fig. 6; but in the remainder of its circumference will allow the arm to rise and ride upon the periphery. This lever is held with the arm V bearing against the cam by means of a spring, a, like the springs S. The other arm, b, of the lever V b extends upward at one side of the arms T U, as seen in Fig. 2, and from it is an extension, d, outside the arms T U. The cam revolves constantly with the pulley, hence imparts a vibratory movement to the projection d toward and from the arms T U of the dogs P R, as indicated in broken lines, Fig. 6.

In the recess D of the receiver a stop, e, is arranged, extending up through a slot in the top of the receiver, and from this stop the rod f extends through a bearing, g, its outer end, h, projecting beyond the end of the receiver, the end H being in a plane above the body of the rod f, as indicated in Fig. 6. In the other recess, E, on the receiver is a like stop, i, from which a like rod, l, extends through the same bearing, g, and at its outer end is a like extension, m, but the extension m being below the plane of the extension h, as seen in Figs. 5 and 6.

Upon a fulcrum, n, levers r and t are hung, the one, r, standing in the plane of the extension m, and the one, t, in the plane of the extension h on the respective rods from the receiver. To these levers upon the opposite side of the fulcrum there is respectively attached a finger, u and w. These fingers extend to positions, the end 2 of the one, u, in front of the arm T of the one dog, P, and the end 3 of the other finger, w, to a position in front of the arm U of the dog R.

The extension d from the arm b has a notch, 4, cut in its face next the arms T U, as seen in Fig. 1, and so that when standing in the position seen in Fig. 1, and which is the condition of the parts when the receiver is being supplied with wads, the vibration of the arm b carrying the projection d will be free and without contact with either of the ends 2 or 3, the notch permitting the extension to pass over the end 3 of the one slide; but should either of the ends 2 or 3 come between the face of the projection d and the respective arms T U, then as the projection d approaches the arms T U, it will strike the one end which happens to be between its face and its arm, as indicated in Fig. 7, broken lines indicating the advance position of the two ends 2 3, and then continuing its movement will force that arm inward, as indicated in broken lines, Fig. 6, correspondingly turning the dog with which it is connected, and releasing the arm on the shaft by which the said dog held the shaft, and when the arm on the shaft is released from such engagement with the dog then the revolution of the pulley is communicated to the shaft, and the shaft will revolve until the other arm strikes the other dog, to be in its turn arrested and held until such time as its dog shall be in like manner operated.

As represented, the receiver stands with the recess D in the position to be charged. The wads are introduced at its open end toward the stop e, and when it shall have been filled to such an extent that the column of wads strikes the stop e, the advance of the column of wads will move that stop, forcing its extension h against the lever t, and turn that lever, as indicated in broken lines, Fig. 1, so as to force the end 2 of the finger u between the face of the extension d and the arm T, it being understood that such movement of the finger occurs while the projection d is in its outward position, then as the projection d returns under the action of the cam W it will strike the end 2, force it against the arm T of the dog P, and thereby turn that dog down into the position indicated in broken lines, Fig. 6, and so as to release the arm M on the shaft, then the revolution of the shaft instantly commences and revolves until the other arm, N, comes into lock engagement with its dog R, when further revolution of the shaft will be arrested, the shaft has therefore made one half-revolution, and in such half-revolution has turned the crank I to the position seen in broken lines, Fig. 6, and correspondingly draws the receiver C toward the shaft, as also indicated in broken lines, Fig. 6, and so that the recess D in the receiver is taken to that side of the bar B, and so that the wads which it had received will readily fall therefrom, leaving the recess E, then over the bar, to be in like manner charged, and when that recess E has been fully charged the column of wads will come against the stop $i$, forcing the extension $m$ against the lever $r$, turning that lever so as to take the end 3 of the finger $w$ between the working face of the extension $d$ and the arm U of the dog R, and so that that dog R will be turned from engagement with its arm N, as was the dog P from its arm M, releasing the shaft, so that another half-revolution will be made, the arm M coming into engagement with the dog P, as before, and as seen in Fig. 6. In this half-revolution the crank is returned to its first position, taking the filled recess E from over the bar B, and discharging it on the opposite side of the bar, and again bringing the recess B over the bar to be in its turn filled. So soon as the column of wads is released the levers $t$ or $r$, as the case may be, are brought back to their normal position by springs 5. The fingers $u w$ are held up to the face of their respective arms by springs 6. The rods $f l$ are each provided with a stop, 7, which will bring up against the bearing $g$, and so as to locate the respective stops $e i$ in their proper relation in their recesses. The stops $e i$ are made adjustable on the rods, so that a greater or less number of wads may be introduced, or may be varied to adapt the machine to wads of different diameters.

Beneath the bar B a hopper, 8, is arranged, as seen in Fig. 5, into which the wads will fall and open to both sides of the bar, as seen in Fig. 4. This hopper contracts to a mouth, Z, through which the wads may pass into the package prepared to receive them.

Supposing each of the recesses to be adapted to receive twenty-five wads, and that two hundred and fifty be the number required for a package, after ten deliveries the machine may be stopped, and the ten times twenty-five wads which have passed through the hopper removed; but to retain the wads in the hopper until the certain number—say two hundred and fifty—has been delivered, I provide a gate, 9, hung in the mouth of the receiver upon an axis, 10. This gate is the segment of a hollow cylinder, its axis being parallel with the line of the receivers above. To its axis at one or both ends an arm, 11, is fixed, by which it may be turned to open or close the mouth of the hopper. The gate extends below the bottom of the mouth of the hopper, and so as to close that end, as indicated in Fig. 4; but the shell of the gate extends upward so that its upper edge may pass through slot 12 in the mouth above, as indicated in broken lines Fig. 4, and thus cut off the mouth above its extreme lower end.

In connection with the arm 11 is a lever, 13, hung upon a rock-shaft, 14, and from this rock-shaft a lever, 15, extends up into the path of a stud, 16, on a gear, 17, into which a pinion, 18, on the shaft G works, and so that as the gear 17 revolves the stud 16 may strike the lever 15, turn the rock-shaft 14, and correspondingly turn the levers 13, and impart a rotative movement to the cylindrical gate, as indicated in Fig. 4. The stud 16 on the gear 17 first engages the lever 15 when in the position indicated in broken lines in that figure, that is at a point nearly opposite the point where the stud will leave the lever. In this movement of the lever the gate is turned from the position indicated in broken lines Fig. 4 to that indicated in solid lines same figure, so that the mouth of the hopper is opened above; hence the wads which have been delivered during this movement will thus fall into the cylindrical gate but so soon as the stud 16 leaves the lever 15, then a spring, 19, reacting will instantly return the lever 15 and 13, and throw the gate back into the position indicated in broken lines Fig. 4, taking the upper edge through the slot 12 of the mouth, and again cutting off. In this movement the lower portion of the gate passes from beneath the mouth of the hopper, and hence will permit the wads which have dropped into the gate to fall out into the package prepared to receive them, and at each revolution of the gear 17 the wads which shall have been delivered to the gate will be discharged. The proportions of the pinion 18 and the gear 17 are such as to make the delivery of the wads after the requisite number shall have been discharged into the gate, say five to one, which will give each recess five discharges, they being adapted to receive twenty-five wads each, will correspondingly deliver two hundred and fifty wads at each complete operation of the machine.

Some force is necessary to be applied to the column of wads to operate upon the stops to produce the automatic change of the receiver which I have described. To do this there is at the open end of the receiver and in line with the bar B a channel, 20, through which the wads pass onto the bar and into that recess in the receiver which may then happen to stand over the bar. This channel is partly covered, as seen in Fig. 10. 21 is a wheel arranged upon a shaft, 22, and so as to work in the channel 20, the axis of the wheel 21 being at right angles to the channel. This wheel 21 is caused to revolve, as indicated by the arrow in Fig. 5, and so that its under surface runs toward the receiver. The wads are delivered beneath the wheel 21, and it working with pressure upon the wads will force them into the channel one after another, and thus keep the column moving until the recess in the receiver be filled, as before described.

The wads may be delivered beneath the wheel 21 by any suitable device, or by hand, if preferred; but to provide an automatic device which shall so deliver the wads beneath the wheel I have applied to the machine the feeding device described in Letters Patent of the United States No. 242,052. This consists of a disk, 23, arranged upon a vertical shaft, 24, and so as to revolve in a horizontal plane, the plane of the upper surface of the disk being in the same plane as the bottom of the channel 20. A rapid revolution is imparted to the disk by means of a pulley, 25, or otherwise, in the direction indicated by the arrow, Fig. 1. Above the disk is a stationary guard, 26, substantially concentric with the disk, but supported, say, at 27, so that the disk may revolve beneath the guard. The lower edge of the guard stands close to the upper surface of the disk, except for a short distance near the channel, where its lower edge is cut away, as seen at 28, Fig. 11. Outside the guard 26 there is a second stationary guard, 29, in the form of an overhanging flange, as seen in Fig. 2. A quantity of wads are placed upon the disk, and as the disk revolves they are naturally thrown by centrifugal force outward against the guard 26, but travel around in contact with that guard until they arrive at the opening 28 beneath the guard. The centrifugal force causes them to pass through this opening and into the space 30 between the guards 26 and 29. This space 30 forms a continuation from the channel 20 onto the surface of the disk and directly beneath the wheel 21. The surface of the disk also extends beneath the wheel, as indicated in Fig. 1. The revolution of the disk after the wads have passed into the space 30 causes them to advance toward the wheel 21, and as they pass beneath that wheel they are forced by the wheel into the channel 20, and thence into the recess in the receiver. The disk is constantly supplied with wads by the attendant, and by the revolution of the disk they are successively delivered beneath the wheel 21 and by it forced in a column into the receiver, it being understood that the wheel 21 runs in such relation to the wads that, while it readily forces them forward when they meet no obstruction, when they do meet an obstruction the wheel will slip upon the wads. The wheel 21 advances the column until it reaches the stop in the receiver, then applies sufficient force to the column to operate upon the stop, as before described, and so as to discharge one recess and present the other. Under this arrangement the operation of the machine is made entirely automatic.

While I prefer to construct the receiver with two recesses to be discharges, the one on one side and the other upon the opposite side of the bar, a receiver with a single recess may be employed, the full revolution of the shaft G being imparted at each time the recess is filled—that is, by dispensing with one of the arms, say N, on the shaft and its dog R, retaining only the arm M and the dog P—the shaft will make a full revolution each time it is released, and move the receiver from the bar to discharge the wads, and return it to receive the second column, and so on.

In case of the employment of a single recess in the receiver, as last described, the receiver itself may remain stationary and the transverse reciprocating movement imparted to the bar B, so that the bar will move beneath the recess for the reception of the wads, and then drawn from beneath the wads will permit them to fall from the receiver, thereupon the bar will be again returned for a second column of wads, and so on. This modification may be illustrated by considering that the connections J are applied directly to the bar B instead of to the receiver, and the receiver held stationary.

The mechanism for intermittingly moving the receiver may be omitted, the attendant imparting the intermittent movement by hand.

I have described the receiver as arranged to move transversely across the bar by a reciprocating or back and forward movement. This transverse movement may, however, be in a continuous path by constructing the receiver in cylindrical form with its axis parallel with the bar, as indicated in Fig. 13. In this case the surface of the cylinder is constructed in the form of a series of recesses, each of which will in its turn be presented to the bar to receive the wads, and pass on to take the wads so received from the bar and deliver them to the hopper, the next recess in like manner receiving and discharging wads, and so on, the cylinder having an intermittent rotation, and so as to pass transversely across the bar. In doing this it will be necessary to convert the reciprocating movement first described to a rotating movement. This may be done by forming a ratchet on the end of the cylinder, as seen in Fig. 13, and applying a pawl to the connecting-rod J, as also indicated in Fig. 13, being a well-known pawl-and-ratchet movement; or the circular path may be from an axis at right angles to the bar, as seen in Fig. 14. In this case the receiver will be in the form of a disk having radial grooves, each of which will in its turn be presented to the bar to receive the wads and then give a partial rotation to present the second recess while the first discharges the wads into the hopper below, and so that the movement of the disk in this case will be substantially the same as that in Fig. 13, except that the pawl and ratchet will be adapted to a vertical axis instead of a horizontal. In any case there is the same intermittent transverse movement of the receiver, so that it may remain stationary while receiving the wads and then by such intermittent movement discharge the wads so received and place the receiver in a position for receiving a second charge of wads.

The feed-wheel 21 may be omitted and the disk deliver the wads directly through the channel to the receiver; but some force between the disk and the receiver is desirable, in order to certainly impart a force to the column to operate upon the stop in the receiver.

Instead of employing the cylindrical gate which I have described, the gate may be constructed as seen in Fig. 12, and so as to consist of two horizontal slides, 31 32, one above the other, both working transversely across the mouth Z, the two hung upon a lever, 33, one above and the other below the fulcrum, the said lever in connection with the lever 13, and so that the gates are alternately thrown across the mouth, one opening while the other cuts off, substantially as do the two edges of the cylindrical gate. When the upper gate is open, the wads fall onto the gate below, and then as the lower gate is withdrawn the upper gate is returned, the return of the one cutting off the mouth before the other is opened, it only being essential to this part of my invention that the gate shall be double-acting—that is, shall be so constructed that the mouth be cut off above before it is opened below.

I claim—

1. The combination of a bar having a longitudinal recess therein adapted to receive a column of wads, a second bar beneath the said recess and upon which the column of wads will rest when in said recess, one of said bars stationary, the other adapted to be moved transversely so as to open and close said recess, an intermittingly-revolving shaft in connection with the said movable part and through which the said transverse reciprocating movement is imparted to said bar, a stop in said recess, and mechanism, substantially such as described, between said stop and shaft, substantially as described, whereby, upon the completion of a column of wads containing the predetermined number, the said column will release said shaft and permit its rotation to discharge said column of wads.

2. The combination of a stationary longitudinal bar, B, the receiver C, constructed with two parallel recesses, D E, and arranged to slide transversely over said bar, a shaft parallel with said bar, crank on said shaft in connection with said receiver, a stop adapted to arrest said shaft at each half-revolution, a stop in each of said recesses, and mechanism, substantially such as described, between said stops in the recesses and the stops which arrest the revolution of the shaft, the said stops in the recesses adapted to be moved by the column of wads forced therein, substantially as described, and whereby, under the completion of a predetermined number of wads in either of said recesses, the stop in said recess will release said shaft and permit its half-revolution.

3. The combination of the longitudinal stationary bar B, the receiver C, constructed with longitudinal recesses D E, and arranged to slide transversely over said bar, the shaft G, carrying cranks in connection with said receiver, arms M N, fixed to said shaft, dogs P R, arranged, respectively, in the paths of the said arms M N, the said dogs constructed, respectively, with an arm, T U, a constantly-revolving cam, W, lever V b, one arm adapted to work upon said cam, the other arm extended to the back of the said dog, arms T U, stops e i in the respective recesses of the receiver, with extensions h m therefrom, levers t r, one arm of which is in the path respectively of the said extensions h m, the other arm carrying, respectively, fingers u w, the said fingers extending between the arm b of the said lever and the arms of the dog, the said arm b constructed with a notch, 4, substantially as described.

4. The combination of the bar B, a receiver constructed with a recess upon its under side parallel with said bar, the one stationary and the other adapted to receive a transverse movement, mechanism, substantially such as described, to intermittently impart said transverse movement to said part, a fixed channel opening to said recess in the receiver and with a feed-wheel adapted to successively force the wads which may be introduced into said channel into the recess in the receiver, and a stop in said receiver to arrest the column of wads when a predetermined number shall have been introduced therein, substantially as described.

5. The combination of the stationary bar B, receiver C, parallel therewith and constructed with two longitudinal recesses, D E, the said receiver adapted to move transversely across said bar to present first one recess and then the other to said bar, a channel in line with said bar and opening to the recess which shall stand over said bar, and a feed adapted to force wads through said channel into the recess in the receiver standing over the bar, and a stop to arrest the column of wads when a predetermined number shall have entered said recess, substantially as described.

6. The combination of the bar B, a receiver constructed with a recess upon its under side parallel with said bar, the one stationary and the other adapted to receive a transverse reciprocating movement, mechanism, substantially such as described, to intermittingly impart said transverse movement to said part, a fixed channel opening to said recess in the receiver and with a feed-wheel adapted to successively force the wads which may be introduced into said channel into the recess in the receiver, and a stop in said receiver to arrest the column of wads when a predetermined number shall have been introduced therein, a disk arranged to revolve in a horizontal plane and in the same plane of the bottom of the said channel, a fixed guard over said disk with an opening through the guard to said channel, substantially as described.

7. The combination of the stationary bar B, receiver C, parallel therewith and constructed with two longitudinal recesses, D E, the said receiver adapted to move transversely across said bar to present first one recess and then the other to said bar, a channel in line with said bar and opening to the recess which shall stand over said bar, a feed adapted to force wads through said channel into the recess in the receiver standing over the bar, and a stop to arrest the column of wads when a predetermined number shall have entered said recess, a disk arranged to revolve in a horizontal plane and in the same plane of the bottom of the said channel, said disk adapted to deliver wads placed thereon into said channel, substantially as described.

8. The combination of the stationary bar B, receiver C, parallel therewith and constructed with two longitudinal recesses, D E, the said receiver adapted to move transversely across said bar to present first one recess and then the other to said bar, a channel in line with said bar opening to the recess which shall stand over said bar, a stop to arrest the column of wads when a predetermined number shall have entered said recess, and a disk arranged to revolve in a plane with the bottom of said channel, said disk adapted to deliver wads placed thereon into said channel, substantially as described.

9. The combination of the stationary bar B, receiver C, parallel therewith and constructed with two longitudinal recesses, D E, the said receiver adapted to move transversely across said bar to present first one recess and then the other to said bar, a channel in line with said bar opening to the recess which shall stand over said bar, a stop to arrest the column of wads when a predetermined number shall have entered said recess, and a disk arranged to revolve in a plane with the bottom of said channel, said disk adapted to deliver wads placed thereon into said channel, and a hopper beneath said bar and into which said recess in the receiver opens for the delivery of the wads, said hopper provided with a mouth through which the wads may escape, substantially as described.

10. The combination of the bar B, a receiver constructed with a recess upon its under side parallel with said bar, the one stationary and the other adapted to receive a transverse reciprocating movement, mechanism substantially such as described to intermittingly impart said transverse movement to said part, a fixed channel opening to said recess in the receiver, and with a feed-wheel adapted to successively force the wads which may be introduced into said channel into the recess in the receiver, and a stop in said receiver to arrest the column of wads when a predetermined number shall have been introduced therein, a disk arranged to revolve in a horizontal plane, a fixed guard over said disk with an opening through the guard to said channel, and a hopper beneath said bar, and into which the said recesses in the receiver open for the delivery of the wads, said hopper provided with a mouth through which the wads may escape, substantially as described.

11. The combination of the stationary bar B, receiver C, parallel therewith and constructed with two longitudinal recesses, D E, the said receiver adapted to move transversely across said bar to present first one recess and then the other to said bar, a channel in line with said bar opening to the recess which shall stand over said bar, a stop to arrest the column of wads when a predetermined number shall have entered said recess, and a disk arranged to revolve in a plane with the bottom of said channel, said disk adapted to deliver wads placed thereon into said channel, and a hopper beneath said bar, and into which said recess in the receiver opens for the delivery of the wads, said hopper provided with a mouth through which the wads may escape, a double-acting gate adapted to work transversely across the mouth at two points, one above the other, with a cam and levers between said gate and cam, substantially as described.

12. The combination of the stationary bar B, receiver constructed with one or more longitudinal recesses adapted to be presented over said bar and parallel therewith, the recess standing over the bar, and the bar itself forming a channel to receive a series of wads, with mechanism substantially such as described to intermittingly impart a transverse movement to said receiver, and a feed adapted to successively deliver the wads into said recess standing over the bar, substantially as described.

WILLIAM MASON.

Witnesses:
DANIEL H. VEADER,
LEE H. DANIELS.